(12) United States Patent
Brouwer et al.

(10) Patent No.: US 6,834,729 B2
(45) Date of Patent: Dec. 28, 2004

(54) SOD ROLL PRE-STARTER

(75) Inventors: Gerardus J. Brouwer, Keswick (CA); Robert Milwain, Keswick (CA)

(73) Assignee: Ontario Limited, Keswick (CA)

( * ) Notice: Subject to any disclaimer, the term of this patent is extended or adjusted under 35 U.S.C. 154(b) by 0 days.

(21) Appl. No.: 10/653,062

(22) Filed: Sep. 3, 2003

(65) Prior Publication Data
US 2004/0079537 A1 Apr. 29, 2004

Related U.S. Application Data
(60) Provisional application No. 60/420,678, filed on Oct. 24, 2002.

(51) Int. Cl.[7] ............................................. A01B 45/04
(52) U.S. Cl. ....................... 172/20; 414/911; 198/308.1
(58) Field of Search ..................... 172/19, 20; 414/911; 198/308.1; 111/901

(56) References Cited
U.S. PATENT DOCUMENTS

| | | | | |
|---|---|---|---|---|
| 6,802 A | * | 10/1849 | Pollet ........................... | 172/19 |
| 2,617,347 A | * | 11/1952 | Henri ........................... | 172/20 |
| 3,464,641 A | * | 9/1969 | Brouwer ................... | 242/535.1 |
| 3,509,944 A | * | 5/1970 | Brouwer et al. .............. | 172/19 |
| 3,540,535 A | * | 11/1970 | Brouwer et al. .............. | 172/20 |
| 3,590,927 A | * | 7/1971 | Brouwer et al. .............. | 172/20 |
| 3,662,837 A | * | 5/1972 | Rothi ........................... | 172/20 |
| 3,790,096 A | * | 2/1974 | Brouwer ................... | 242/541.2 |
| 4,142,691 A | * | 3/1979 | Watton ...................... | 242/541.2 |
| 4,621,696 A | * | 11/1986 | Brouwer ...................... | 172/20 |
| 4,828,040 A | * | 5/1989 | Schumacher .................. | 172/19 |
| 5,165,617 A | * | 11/1992 | van Vuuren ............. | 242/535.1 |
| 5,626,195 A | * | 5/1997 | Dover ........................... | 172/19 |

* cited by examiner

*Primary Examiner*—Victor Batson
(74) *Attorney, Agent, or Firm*—Bereskin & Parr

(57) ABSTRACT

A pre-starter for starting a turn in the end of a sod strip travelling up a conveyor in a sod harvester. The pre-starter includes a metal plate sloping downwardly and rearwardly with its end pressing against the sod strip to catch the blades of grass on the upper surface of the sod strip, thereby causing the end of the sod strip to curl upwardly. The curled end of the sod strip then moves into a conventional sod roll-up mechanism spaced immediately behind the pre-starter, to roll the sod strip. This forms accurate and consistent rolls suitable for automation.

8 Claims, 4 Drawing Sheets

SOD ROLL PRE-STARTER

PRIOR APPLICATION

This application claims the benefit of U.S. Provisional Application Ser. No. 60/420,678, filed Oct. 24, 2002 entitled "SOD ROLL PRE-STARTER".

FIELD OF THE INVENTION

This invention relates to a pre-starter for use with a sod roll-up mechanism in a sod harvester.

BACKGROUND OF THE INVENTION

Automatic sod harvesters which cut a strip of sod from a field of sod, and then form the cut strip into discrete rolls of sod, have been well-known since the late 1960's. More recently, there has been a trend to providing mechanisms which can receive and store a number of sod rolls, and which can then transfer the stored rolls onto a pallet. An example of such a mechanism is shown in U.S. Pat. No. 4,966,239 to Hutchison.

In mechanisms which automatically handle and manipulate sod rolls, it is desirable for the rolls to be formed consistently. Preferably the start and end points of the sod strip which forms the sod roll should be accurately and consistently positioned, so that the roll handling mechanisms will have a minimal number of variations with which to deal.

Normally the sod to be formed into a roll is located on a conveyor which carries the cut sod upwardly and rearwardly from a sod undercutting blade, to a sod roll-up mechanism. Such mechanisms include a starter for starting a turn in the end of the strip of sod travelling up the conveyor. These sod roll-up mechanisms have been very well-known for many years.

A difficulty with prior art devices for starting a turn in the end of a sod strip is that they often perform inconsistently. In some cases they may fail to start a turn, and in other cases they may start a turn at different positions along the conveyor, thus causing the end of the sod strip which forms the roll to be located at different angular positions in the finished rolls. As mentioned, this is undesirable for automated sod roll handling equipment.

BRIEF SUMMARY OF THE INVENTION

It is therefore an object of the invention, in one of its aspects, to provide a pre-starter for starting a turn in the end of a sod strip travelling along a conveyor. The pre-starter is intended to operate in conjunction with a conventional sod rolling device which rolls the strip of sod the end of which has been turned up by the pre-starter.

In one aspect, the invention provides a pre-starter for turning the end of a sod strip moving rearwardly along a conveyor, said strip having an upper surface and a rear edge, said pre-starter comprising a pressure member extending across said sod strip and having a rear end, a support for said pressure member, said support pivotably supporting said pressure member with said rear end thereof sloping downwardly and rearwardly to press against said upper surface of said sod strip to cause said end of said strip to curl upwardly.

Further objects and advantages of the invention will appear from the following description, taken together with the accompanying drawings.

DETAILED DESCRIPTION OF PREFERRED EMBODIMENTS

Figure 1:
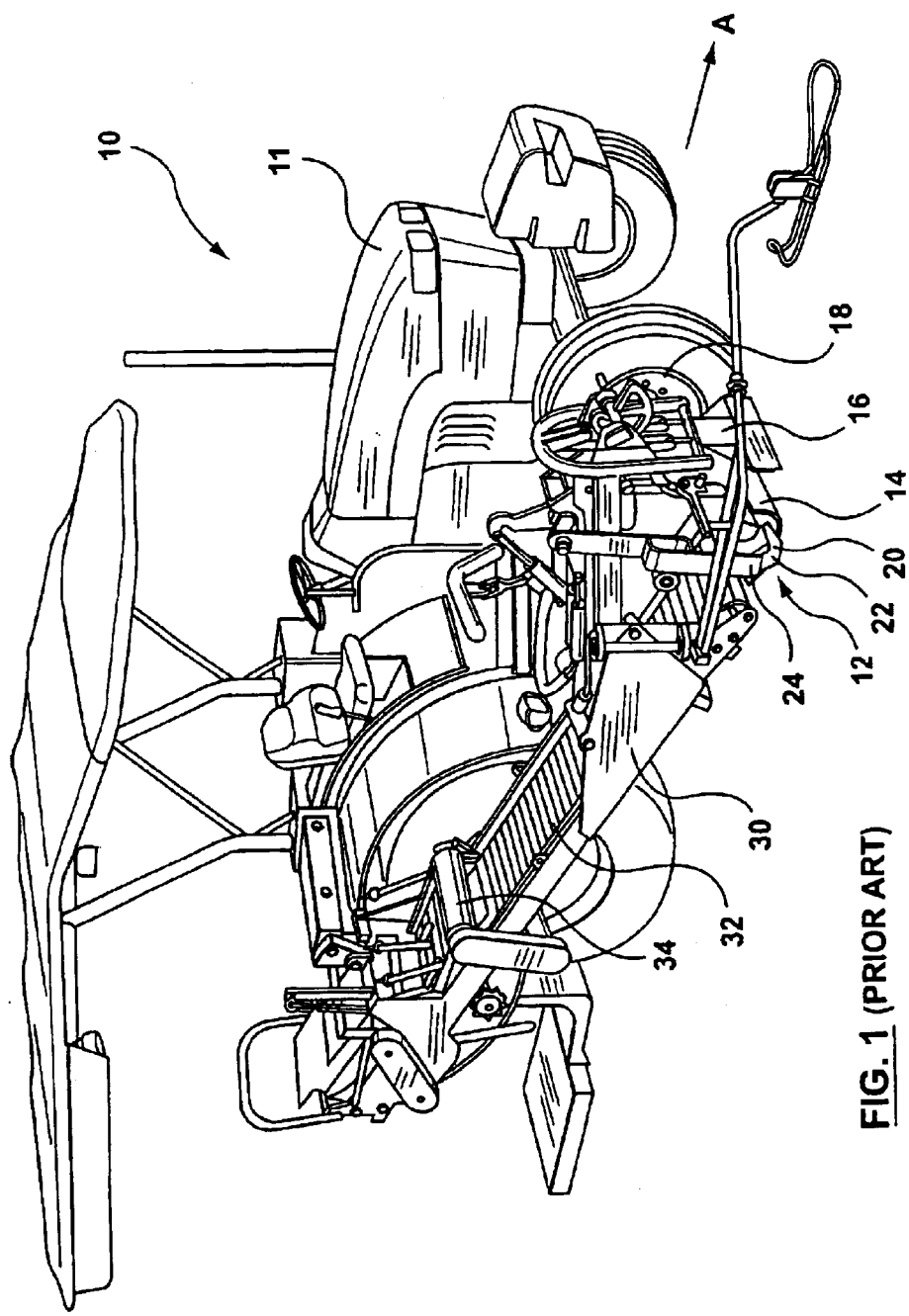
FIG. 1 is a perspective view of a prior art sod harvester, showing an environment in which the pre-starter of the invention may be used.
Figure 2:
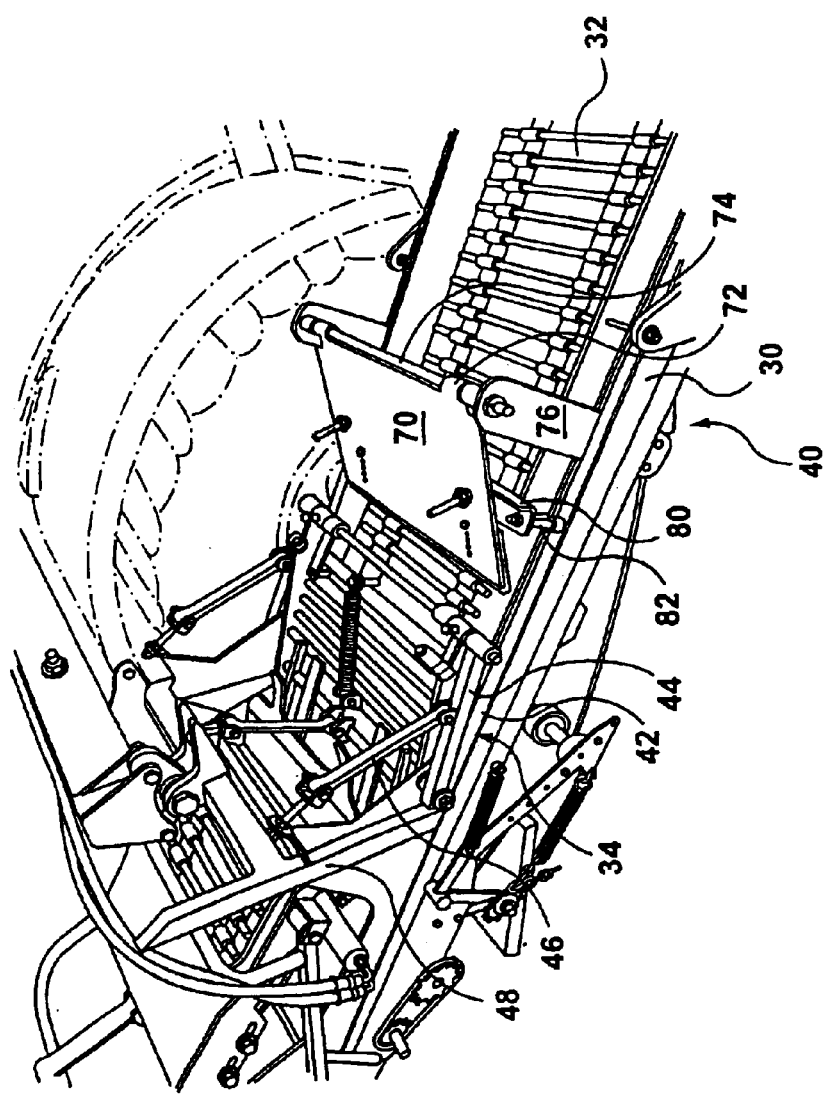
FIG. 2 is a perspective view of a portion of the sod harvester of FIG. 1 and showing a pre-starter according to the invention.
Figure 3:
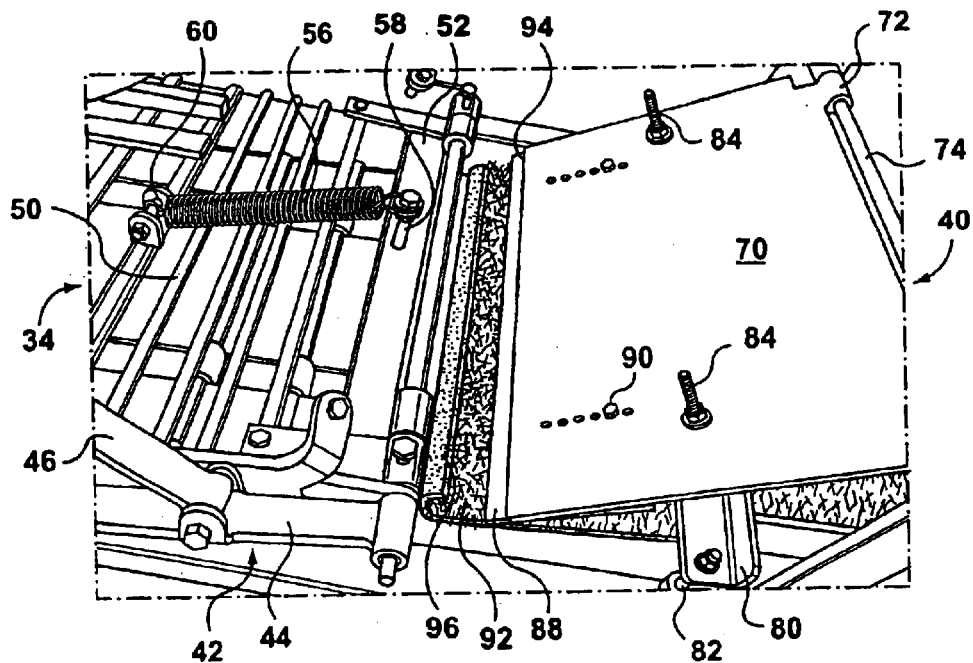
FIG. 3 is a perspective view of a pre-starter according to the invention spaced in front of a conventional roll-up mechanism.
Figure 4:
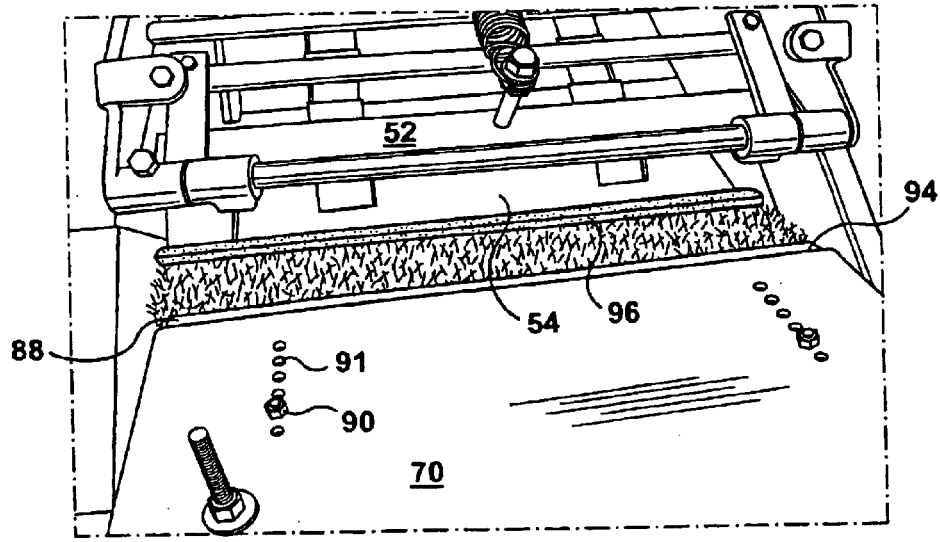
FIG. 4 is another perspective view of a pre-starter according to the invention spaced in front of a conventional sod roll-up mechanism.
Figure 5:
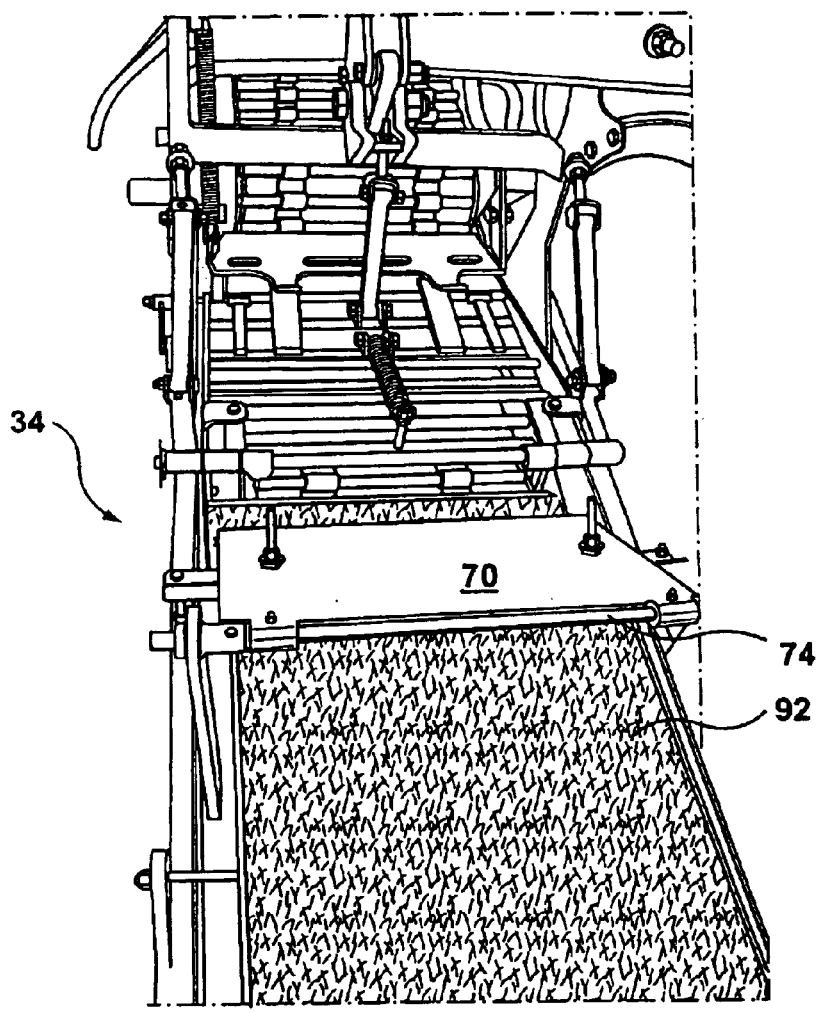
FIG. 5 is a perspective view similar to that of FIG. 4.

Sod harvesters may be attached to a tractor for propulsion, or may be self-propelled. FIG. 1 illustrates a typical prior art sod harvester 10 such as that produced by Kesmac Inc. of Keswick, Ontario, Canada, for attachment to a tractor 11. However, the invention is equally applicable to a self-propelled sod harvester, such as that shown in U.S. Pat. No. 4,966,239. In either case, the harvester 10 travels forwardly along a path of travel A.

The sod harvester 10 includes a cutting head 12 containing a conventional ground roller 14 located behind a conventional cross cut blade 16. The cross cut blade 16 is driven downwardly at periodic intervals (by a conventional drive mechanism 18) to form a transverse cut in the ground, so that the strip of sod which is to be cut by the cutting head 12 will be cut in lengths, each of which can be formed into a roll.

The strip of sod to be cut travels beneath the roller 14 and is then undercut by a conventional undercutting knife 20, which includes side cutting blades 22, one at each side thereof. The undercutting knife 20 is mounted on arms 24 which are reciprocated forwardly and rearwardly in conventional fashion by a hydraulic motor (not shown), to cut a strip of sod.

The cutting head 12 is mounted on a conveyor frame 30 which extends rearwardly from the cutting head. A main conveyor 32 having a planar upper flight is mounted in the conveyor frame 30 and carries cut sod rearwardly and upwardly from the undercutting knife 20, to a sod roll-up mechanism 34 where the sod is rolled. The sod rolls are then delivered (in the prior art harvester shown) to a location where the operator can manually place the roll on a pallet (not shown) carried by the harvester.

FIGS. 2 to 5 are perspective views of a portion of the conveyor and conveyor frame of the FIG. 1 sod harvester, showing the conventional sod roll starter and rolling mechanism 34, and also showing a roll pre-starter 40 according to the invention. The conventional rolling mechanism comprises a roll-up frame 42 having sidebars 44 suspended by pivotably connected links from an upper part 48 of the conveyor frame (as is well-known in the art). The sidebars 44 are connected to each other by transverse rods 50. At the front of the roll-up mechanism 34 there is a "flipper" 52 which is pivotably mounted so that it presents a flat transverse surface 54 which is contacted by the leading edge of the sod strip advancing rearwardly (with respect to path of travel A) up the conveyor 32. The flipper 52 is biased to a vertical position by spring 56 which is connected between a post 58 on the flipper, and a mount 60 on one of the transverse rods 50.

When the leading edge of the sod strip contacts the flipper 52, the flipper 52 pivots rearwardly, allowing the leading edge of the sod strip to pass beneath it and also tending to turn the leading edge of the sod strip. This starts the roll, and the rolling action then continues as the sod is carried upwardly and rearwardly along the conveyor 32, with the upper edge of the roll being contacted by the transverse rods 50 of the sod rolling mechanism to create a roll-up action.

As mentioned, a disadvantage of the standard roll-up mechanism shown and described is that the flipper 52 does not consistently start a turn in the end of the sod strip, so in some cases the sod strip moves partly underneath the sod roll-up mechanism 34 before its end turns and the roll begins to form. The parameters of the roll, including the location of the end of the sod strip on the roll, may then vary from one roll to another.

The pre-starter 40 is spaced slightly forwardly of the conventional roll-up mechanism 34 and comprises a pressure member 70 (preferably comprising a plate of metal or the like) pivotably mounted at its forward end by tubular supports 72 on a cross-shaft 74. The cross-shaft 74 is mounted on vertical posts 76, one at each side of pressure member 70. The posts 76 are secured (by bolts, not shown) to the conveyor frame 30. Typically the vertical posts 76 are made adjustable forwardly and rearwardly, as well as vertically (by a series of spaced bolt holes), for fine tuning of the pre-starter, depending on the soil conditions.

The pressure member 70 extends from tubular supports 72 rearwardly and downwardly toward the conveyor 32, with the angle and spacing above the conveyor being controlled partly by the height of posts 76, and partly by a cross bar 80. The cross bar 80 is supported on the conveyor frame 30 by two bolts 82, one at each side of the cross bar 80, and is adjustable in height by reason of these bolts. The pressure member 70 rests on cross bar 80 when no sod is present and its rear edge is thus held (for example) about one-half inch to one inch above conveyor 32. (The reason for this spacing is discussed below.) The angle which pressure member 70 forms with the upper surface of conveyor 32 is preferably between 10° and 80° and is most preferably between 25° and 60°.

Two bolts 84 protrude from the upper surface of the pressure member 70 and are used for mounting weights on the pressure member 70, if such weights are needed (again depending on soil conditions).

Preferably, but not necessarily, the pressure member includes a wear plate 88 of rubber, plastic or other suitable material, secured to the underside of the pressure member 70 by bolts 90. Wear plate 88 projects slightly rearwardly beyond the rear edge of the metal portion of pressure member 70, for wear purposes, and is adjustable (by bolt holes 91) and replaceable.

Figure 6:
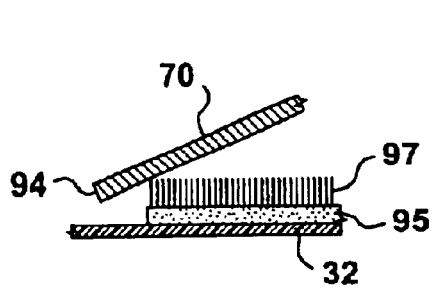
FIG. 6 is a side sectional view showing positioning of a pressure member of a pre-starter according to the invention as used.

In operation, as the harvester 10 moves forwardly, a strip of sod 92 (only the end of the sod strip is shown) moves rearwardly up the conveyor 32 and travels beneath the rear edge 94 of the pressure member 70. The rear edge 94 is as mentioned held slightly above conveyor 32 by cross bar 80, partly so that it does not rest on and interfere with the actual conveyor surface, and partly so that it will be above the dirt portion 95 (see FIG. 6) of the sod strip 92, and will contact and rub on only the grass blades 98 of the sod strip 92. The height of cross bar 80 is adjustable for this purpose. Thus, the pressure member 70 does not actually roll the sod strip (which it would tend to do if its rear edge 94 hung below the dirt portion 95 of the sod), but it does press on the upper surface of the strip of sod with some force (adjustable by the angle and length of the pressure member 70 and any weights mounted on it), to catch the grass blades 98 of the sod strip 92. This causes the end of the sod strip 92 to curl upwardly, as indicated at 96 in the drawings The upwardly curled end 96 of the sod strip then contacts the flipper 52, which is as shown located closely rearwardly of the rear edge 94 of the pressure member 70. Typically the spacing of flipper 52 behind rear edge 94 is one to four inches (and can be adjusted by moving posts 76 as mentioned, depending on sod conditions). Because the end of the sod strip is curled upwardly when it contacts the flipper 52, the flipper will reliably cause the end of the sod strip to turn further, thus reliably starting a roll at the beginning of the sod roll-up mechanism 34. Thus, the parameters of the sod roll (including the start and end parts of the sod strip forming the roll) will be more accurately defined.

It will be appreciated that the dimensions of the pre-starter shown can vary. For example, the forward end of the plate pressure member 70 may be as little as about three inches above the conveyor 32 (it must be sufficiently spaced above the conveyor to allow sod to pass therethrough), or it can be as much as eight inches or more above the conveyor 32. The pressure member 70 can vary in length, e.g. it can be as little as six inches long or as long as about two feet (or more), but typically it is about twelve inches long. In all cases, the pressure member 70 will slope downwardly toward the sod passing beneath it and will press on that sod with sufficient pressure to cause the sod to curl. If the sod is tough (e.g. formed from clay soil), then more pressure and hence more weight will be needed. If the sod is formed from sandy soil, then less pressure and less weight will be needed to cause the end of the sod to curl. Preferably the rear edge 94 of pressure member 70 is as mentioned hung above the dirt portion of the sod but below the top of the grass blades. Adjustment to suit soil conditions may thus be needed.

Figure 7:
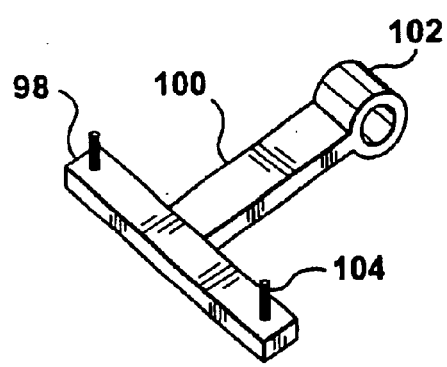
FIG. 7 is a diagrammatic view of a modified pre-starter according to the invention.

In addition, while pressure member 70 has been illustrated as comprising a metal plate, other geometries may be used, e.g. a flat, thin transverse bar 98 (as shown in FIG. 7), with a forwardly extending strut 100 pivotally supported at its front end 102. The bar 98 extends across the width of the sod strip 92 and may be weighted as needed (using weight receiving bolts 104) so that it will turn the end of sod strips moving up the conveyor 32. Alternatively, any weights needed for the pressure member can be replaced by a biasing spring.

Alternatively, pressure member 70 may be formed as a set of rearwardly extending, parallel, laterally spaced fingers which press on the upper surface of the sod strip.

While a preferred embodiment of the invention has been described, it will be realized that various changes can be made, within the scope of the invention.

We claim:

1. A pre-starter for turning the end of a sod strip moving rearwardly along a conveyor, said strip having an upper surface and a rear edge, said pre-starter comprising a pressure member extending across said sod strip and having a rear end, a support for said pressure member, said support pivotally supporting said pressure member with said rear end thereof sloping downwardly and rearwardly to press against said upper surface of said sod strip to cause said end of said strip to curl upwardly, said pre-starter being mounted on a sod harvester, said sod harvester including a sod roll-up mechanism and said pre-starter being spaced closely in front of said sod roll-up mechanism.

2. A pre-starter according to claim 1 wherein said pressure member comprises a metal plate.

3. A pre-starter according to claim 2 wherein said conveyor has a planar upper flight for moving said sod strip, and said metal plate is supported on said conveyor to form an angle of between 25° and 60° with said upper surface of said conveyor.

4. A pre-starter according to claim 3 including at least one weight receiving member on said plate to receive weights to adjust the pressure of said pressure member on said sod strip.

5. A pre-starter according to claim 3 wherein said support is adjustable upwardly and downwardly to adjust said angle.

6. A pre-starter according to claim 3 and including a further support for said plate for adjusting said angle, said further support maintaining said rear end of said pressure member a selected distance above said conveyor.

7. A pre-starter according to claim 1 wherein said support is adjustable forwardly and rearwardly.

8. A pre-starter according to claim 1 wherein said sod strip has a dirt portion having a first height above said conveyor and a grass portion having a second height above said conveyor, and including a support to position said rear end of said pressure member between said first and second heights in the absence of said sod strip.

* * * * *